United States Patent
Taneja et al.

(10) Patent No.: US 8,150,914 B1
(45) Date of Patent: Apr. 3, 2012

(54) SIMULTANEOUS DOWNLOAD OF APPLICATION FILE PORTIONS

(75) Inventors: Manik Taneja, San Francisco, CA (US); Sriharsha Bhadravathi Krishnamurthy, San Francisco, CA (US); Javesh Jose, San Francisco, CA (US); Anandamoy Roychowdhary, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/244,835

(22) Filed: Sep. 26, 2011

Related U.S. Application Data

(63) Continuation of application No. 13/115,806, filed on May 25, 2011.

(51) Int. Cl.
*G06F 15/16* (2006.01)
*G06F 15/173* (2006.01)

(52) U.S. Cl. ........ 709/203; 709/218; 709/219; 709/226; 709/228

(58) Field of Classification Search .................. 709/203, 709/218, 219, 226, 228, 230
See application file for complete search history.

(56) References Cited

U.S. PATENT DOCUMENTS

| | | | |
|---|---|---|---|
| 6,505,216 B1 * | 1/2003 | Schutzman et al. | 707/999.202 |
| 2002/0078174 A1 * | 6/2002 | Sim et al. | 709/219 |
| 2002/0083118 A1 * | 6/2002 | Sim | 709/105 |
| 2003/0031176 A1 * | 2/2003 | Sim | 709/203 |
| 2005/0044250 A1 * | 2/2005 | Gay et al. | 709/230 |

* cited by examiner

*Primary Examiner* — Quang N. Nguyen
(74) *Attorney, Agent, or Firm* — Schwegman, Lundberg & Woessner, P.A.

(57) ABSTRACT

Example systems and methods for downloading an application file are presented herein. In an example, configuration information for downloading the application file is received. The configuration information indicates a partition quantity indicating a number of file portions into which the application file is partitioned at one or more server computers. Network addresses for the file portions are determined based on the configuration information. A request is issued for each of the multiple file portions based on the network addresses, with the requests being issued over multiple network connections. The multiple file portions are received over the multiple network connections, with at least two of the multiple file portions being received simultaneously over separate ones of the multiple network connections. The received multiple file portions are combined to form the application file.

16 Claims, 8 Drawing Sheets

SIMULTANEOUS DOWNLOAD OF APPLICATION FILE PORTIONS

PRIORITY CLAIM

This application is a continuation of U.S. patent application Ser. No. 13/115,806, entitled "SIMULTANEOUS DOWNLOAD OF APPLICATION FILE PORTIONS," filed on May 25, 2011, which claims the benefit of priority under 35 U.S.C. §119 of Indian Provisional Patent Application Serial Number 655/CHE/2011, entitled "SIMULTANEOUS DOWNLOAD OF APPLICATION FILE PORTIONS," filed on Mar. 4, 2011. Each of these applications is hereby incorporated herein by reference in its entirety.

TECHNICAL FIELD

The present disclosure relates to online games and applications. In an example embodiment, a game server partitions an application file into multiple partitions for a client device to download using multiple network connections.

BACKGROUND

A client device may load a computer-implemented online game by downloading one or more application files from a game server. For example, a Web browser on the client device may download multiple Adobe® Flash® object files that implement the client side of the online game. However, analyzing the load performance for online games reveals that the time taken to download a main application file is responsible for a large percentage of the total time it takes to load the game at the client device.

Consider that the total amount of data that needs to be downloaded for the application to become interactive is, merely for example, approximately 6.6 megabytes (MB). Of this data, the main application file may account for approximately 4 MB of the total data downloaded. This causes a problem when multiple files are downloaded for the online game using a single network connection (e.g., a TCP connection), particularly because a typical Web browser may not initiate download for other application components until the web browser completes the download for the main application file.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

A computer-implemented virtual game can be rich in content and animations. For example, an online game can have application files (e.g., Adobe® Flash® SWF files) that are undesirably large. Unfortunately, downloading large amounts of data over a single network connection (e.g., a transfer command protocol, or TCP, connection) may not result in optimal bandwidth usage between two endpoints of the network connection. In many cases, the transfer rate for a large file over a single network connection may be affected by traffic shaping algorithms that are deployed by network operators to ensure fair use of available bandwidth among multiple network clients.

Some example embodiments provide a method and apparatus for loading application files at a client device using multiple network connections. In various embodiments, a build environment for the virtual game may partition large application files into a set of smaller files that can be accessed by a client device over multiple network connections. This build environment can free developers from having to manually split a large implementation file into separate files, which consumes valuable development time and can introduce bugs into the virtual game.

When the player initiates a game load at the client device, the client device may first download a preloader application. The preloader application displays a "patience page" or a download progress bar, downloads the separate file portions (e.g., using multiple near-simultaneous network connections) from a game server, and loads the virtual game from these multiple file portions. In various embodiments, the preloader application may be implemented as an Adobe® Flash® application that runs within a web browser at the client device. Once the preloader application completes the downloading of the application files into the web browser, the preloader application may initiate the virtual game at the client device so that it becomes interactive.

Example System

Figure 1:
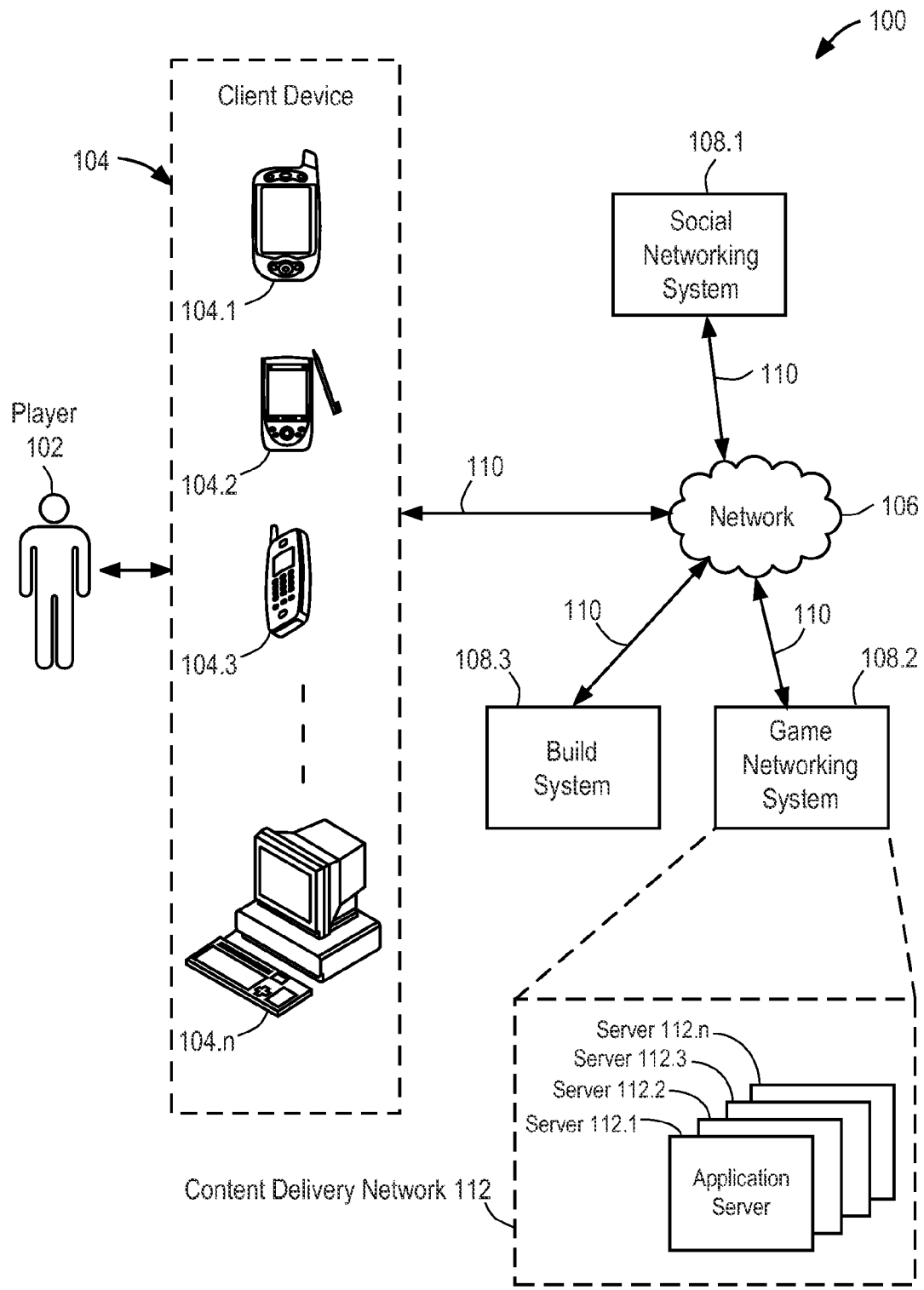
FIG. 1 illustrates an example of a system for implementing various example embodiments.

FIG. 1 illustrates an example of a system 100 for implementing various example embodiments. In some embodiments, the system 100 comprises a player 102, a client device 104, a network 106, a social networking system 108.1, and a game networking system 108.2. The components of the system 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The client device 104 may be any suitable computing device (e.g., devices 104.1-104.n), such as a smart phone 104.1, a personal digital assistant 104.2, a mobile phone 104.3, a personal computer 104.n, a laptop, a computing tablet, or any other device suitable for playing a virtual game.

The client device 104 may access the social networking system 108.1 or the game networking system 108.2 directly, via the network 106, or via a third-party system. For example, the client device 104 may access the game networking system 108.2 via the social networking system 108.1.

The social networking system 108.11 may include a network-addressable computing system that can host one or more social graphs (see for example FIG. 2), and may be accessed by the other components of system 100 either directly or via the network 106. The social networking system 108.1 may generate, store, receive, and transmit social networking data.

Moreover, the game networking system 108.2 may include a network-addressable computing system (or systems) that can host one or more virtual games, for example, online games. For example, the game networking system 108.2 may include a content delivery, network 112 that may include one or more application servers (e.g., application servers 112.1-112.n) that provide application files to the client device 104 using one or more connections 110 over the network 106. The game networking system 108.2 may generate, store, receive, and transmit game-related data, such as, for example, game application files, game account data, game input, game state data, and game displays.

The game networking system 108.2 may be accessed by the other components of system 100 either directly or via the network 106. The player 102 may use the client device 104 to access, send data to, and receive data from the social networking system 108.1 and/or the game networking system 108.2. In various example embodiments, the client device 104 may receive a plurality of application files for the virtual game from the game networking system 108.2 via multiple connections 110.

The build system 108.3 may include a network-addressable computing system (or systems) that may compile a client-side application for the virtual game into one or more application files, and may partition a particular application file into multiple file portions. Moreover, the build system 108.3 may transfer these file portions to the content delivery network 112 via, network 106.

Although FIG. 1 illustrates a particular example of the arrangement of the player 102, the client device 104, the social networking system 108.1, the game networking system 108.2, and the network 106, this disclosure includes any suitable arrangement or configuration of these components of system 100.

Loading Game Files Using Multiple Simultaneous Network Connections

Note that typical techniques for accessing a file using multiple network connections may not be used in some runtime environments. For example, web browsers and/or some Flash® media players may implement security measures that disallow use of HTTP range requests, which request a portion of an existing file at a server. In particular embodiments, a build server for the virtual game may partition an application file into smaller file portions, and may provide a client device with configuration information that allows a preloader application to generate separate requests for these file portions using multiple near-simultaneous network connections. The preloader application may initiate multiple download requests for the application file portions that are stored separately on one or more application servers of the content delivery network 112, and may combine these file portions to form the desired application file (e.g., a Flash® SWF file) that the client device 104 can load.

In some example embodiments, the build system 108.3 may partition an application file into multiple file portions before transferring it to the game networking system 108.2. Further, the client device 104 may use the preloader application to initiate multiple simultaneous network connections (e.g., connections 110) to download these file portions of an application file from the game networking system 108.2, such that different network connections may be used to download different unique portions of the application file.

Figure 2:
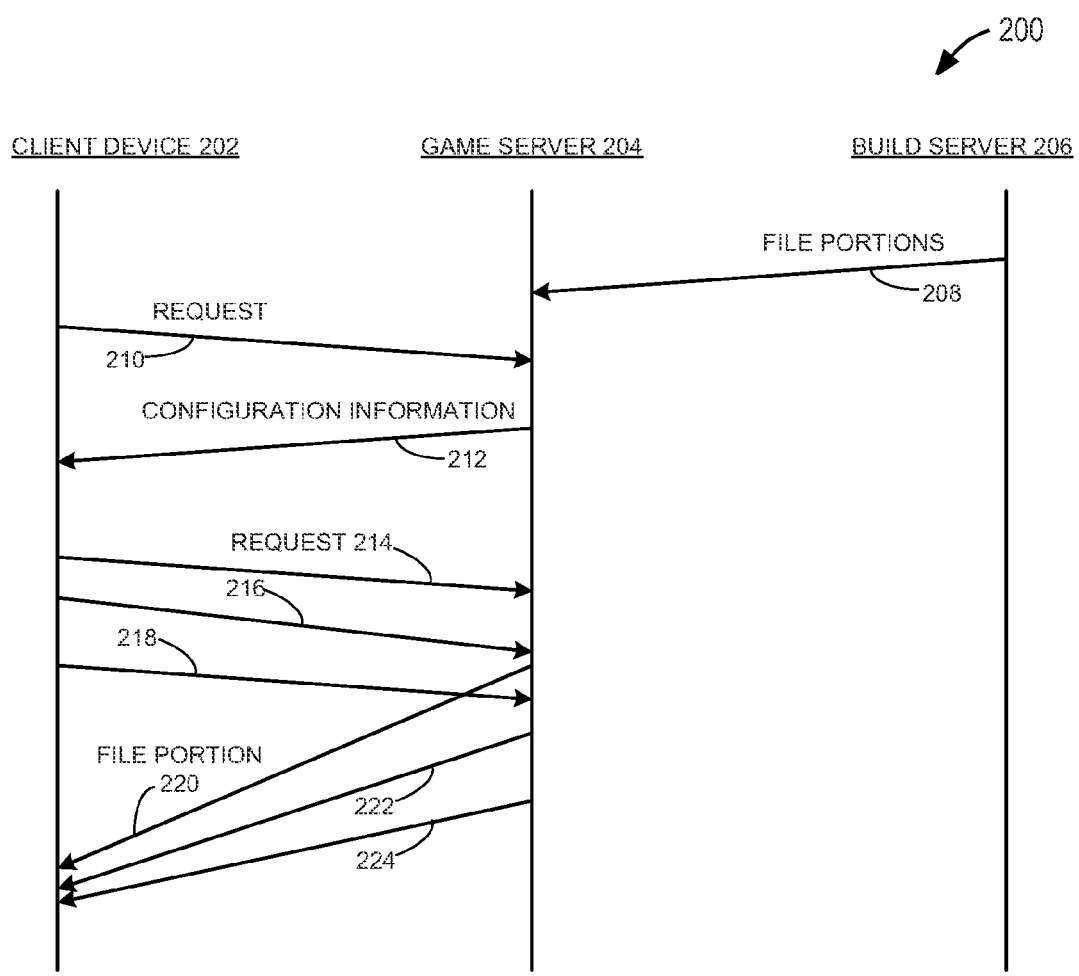
FIG. 2 shows a diagram illustrating example communications between example components of an example system.

FIG. 2 shows a diagram illustrating example communications 200 between example components of an example system. The communications 200 may be performed using one or more of the components of example system 100 and, accordingly, are described by way of example with reference thereto. For example, client device 202 may correspond to the client device 104, game server 204 may correspond to the content delivery network 112, and build server 206 may correspond to the build system 108.3.

The build server 206 may partition an application file of the virtual game into multiple file portions 208, and may send these file portions 208 to the game server 204. The build server 206 may send configuration information that indicates how an application file is partitioned, and how the individual file portions 208 are to be combined to reproduce the application file. For example, the build server 206 may generate an Extensible Markup Language (XML) document to include the configuration information that indicates, for an application file, the individual file portions 208 (and their ordering) that are combined to reproduce the application file. Further, the game server 204 may generate additional configuration information that is used to download the individual file portions 208 (e.g., hostnames for one or more web servers of the content delivery network 112, path and/or file names for the individual file portions 208, and/or the like).

The game server 204 may also generate HTML document that includes this configuration information, and that allows a browser at the client device 202 to download and execute a preloader application that facilitates downloading the plurality of file portions 208 using multiple network connections 110. The preloader application may include scripts and/or executable code that is used by the client device 202 to download the file portions 208, and to combine the file portions 208 to reproduce the application file of the virtual game.

When the game server 204 receives a request for the virtual game, the game server 204 may respond by sending the configuration information 212 to the client device 202. For example, the game server 204 may send the HTML file that includes the configuration information 212, and that causes the client device 202 to download and execute a preloader application that facilitates downloading the virtual game. In some embodiments, the configuration information 212 may be provided to the preloader application by the HTML document when the preloader application is launched. In other embodiments, the configuration information 212 may be provided to the preloader application using a data file, such as an XML (Extensible Markup Language) file, a JSON (JavaScript Object Notation) file, and/or the like, The configuration information 212 may include at least the number of partitions for a particular application file, one or more hostnames for game servers from which to download the file portions 208, a network address naming scheme that is used by the preloader application to determine a network address (e.g., a uniform resource locator, or URL) when loading individual file portions 208 during the game load sequence, and the like. As an example, a main application file can be partitioned into three file portions (e.g., file portions 220-224), and may be stored at the game server 204 with a filename suffix "_i", such that T denotes a sequence number for a particular file portion (e.g., file portion 220).

The client device 202 may use the preloader application to load the application file based on the configuration information, which causes the client device 202 to send multiple requests (e.g., requests 214-218), using multiple near-simultaneous network connections 110, to the game server 204. For example, the client device 202 may initiate the preloader application using various parameters, including: 'num_parts' to indicate a number of partitions for a desired file, and a suffix string that may be used to determine a network address for a file portion of the desired file. The preloader application may then initiate downloading of the plurality of file portions 208 for the desired file using multiple network connections 110 and the network address.

The game server 204 may respond by sending the file portions 208 to the client device 202 over these multiple near-simultaneous connections (e.g., a near-simultaneous transfer of file portions 220-224). The preloader application may then combine the plurality of file portions 208 at the client device 202 to reproduce the application file.

Build System and Application Servers

Figure 3:
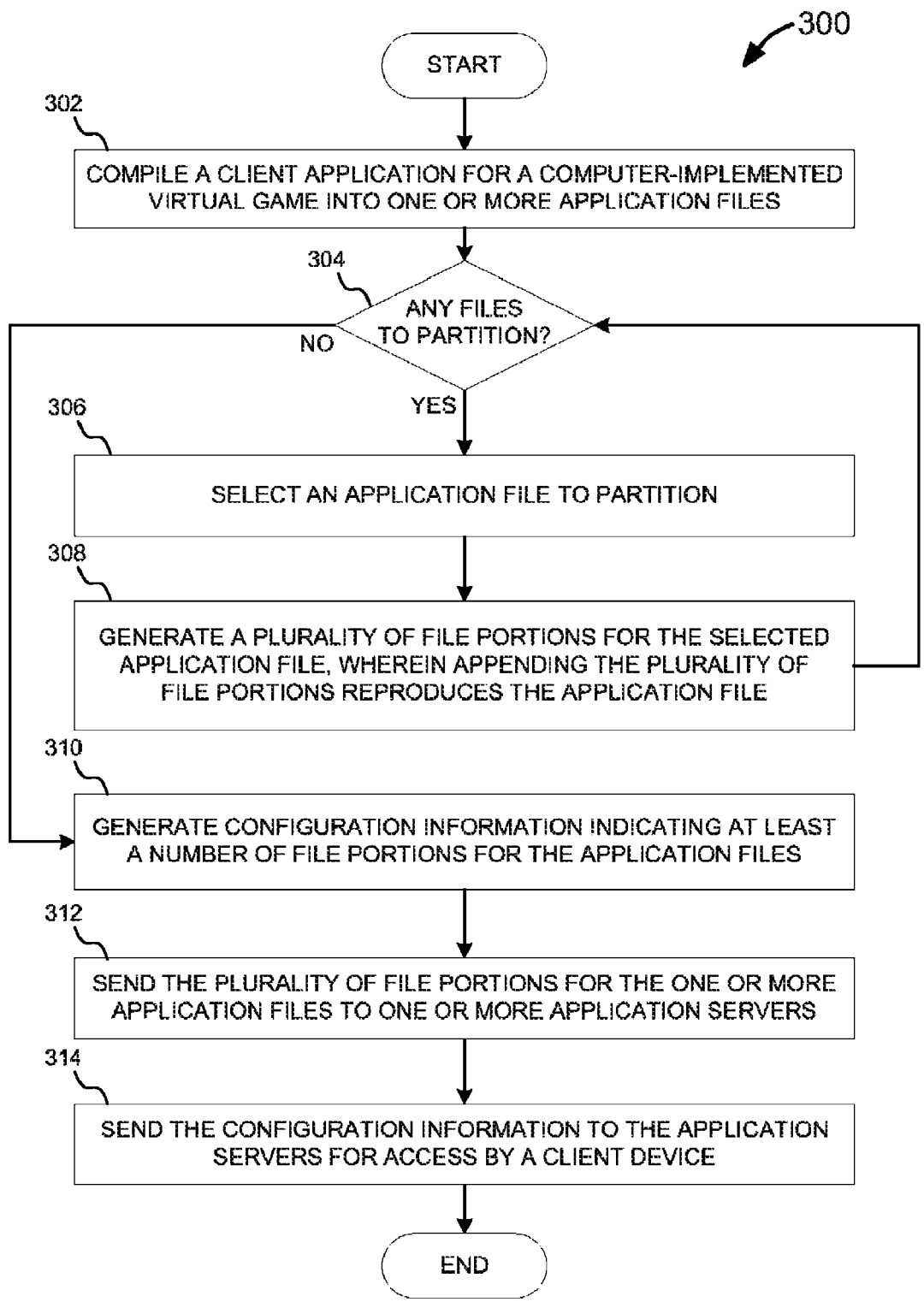
FIG. 3 shows a flowchart illustrating an example method for building and storing application files at one or more application servers.

FIG. 3 shows a flowchart illustrating an example method 300 to build and store application files at one or more application servers. In some embodiments, the method 300 may be performed using the build system 108.3 and/or the game networking system 108.2 and, accordingly, is described by way of example with reference thereto.

The method 300 may begin, at operation 302, by compiling a client application for the virtual game into one or more application files. The method 300 then determines at operation 304 whether any application files need to be partitioned. In various embodiments, the method 300 determines that an application file needs to be partitioned when the application file is above a determinable file size. For example, the method 300 may compute a maximum file size based on empirical data on average download times for a variety of client devices at a variety of physical locations. Thus, the method 300 may adjust how it partitions an application file to account for changes in the network capabilities of the client device 104, the network 106, and/or the game networking system 108.2. As another example, the method 300 may determine the maximum file size by accessing configuration information for how the application file is to be partitioned (e.g., by accessing a database, or by reading a configuration file). In various embodiments, the method 300 may partition individual application files into a determinable number of file portions, and operation 304 determines whether an application file exists which has not yet been partitioned.

If the method 300 determines at operation 304 that at least one application file needs to be partitioned, the method 300 continues to operation 306 to select an application file to partition. Then, at operation 308, the method 300 may generate the plurality of file portions 208 for the selected application file, such that appending the plurality of file portions reproduces the application file. For example, the method 300 may use the "split" Unix command to create the plurality of file portions for the application file. In various embodiments, the method 300 may generate the plurality of file portions so that individual file portions are below the determinable file size. The method 300 may then return to operation 304 to determine whether any other application file needs to be partitioned.

If the method 300 determines at operation 304 that no more application files need to be partitioned, the method 300 may continue to operation 310 to generate configuration information that the client device may use to load the virtual game. The method 300 may generate a configuration file that includes the configuration information, and that is used by the client device 104 to load the client application (e.g., an HTML document that is used by a web browser at the client device 104). In some example embodiments, the configuration information may indicate one or more hostnames for the application servers, and may also indicate a number of file portions into which an individual application file has been partitioned. In various example embodiments, the configuration information may indicate the number of file portions for the individual application files (e.g., if individual application files may be partitioned into different numbers of file portions than other application files). In some example embodiments, if the application files have been partitioned into a fixed number of file portions, the configuration information may indicate this fixed number of file portions that may be used for all desired files. Then at operation 312, the method 300 may send the plurality of file portions for the application files to one or more application servers. Further, at operation 314, the method 300 may send the configuration information to the application servers for access by the client device 104.

In various embodiments, at operations 308 and 310, the method 300 may incrementally provide the file portions and configuration information to the application servers. For example, after performing operation 308 to partition an application file, the method 300 may continue to operation 310-314 to provide the application server with the plurality of file portions and configuration information for the application file that was just partitioned. Then, after performing operation 314, the application server may continue to operation 304. Thus, the method 300 may end at operation 304 when the method 300 determines that no more application files need to be partitioned.

In some example embodiments, the method 300 may store the plurality of file portions at multiple servers of the content delivery network 112 that are associated with different hostnames. For example, for an application file that is partitioned into four file portions, the individual file portions may be downloaded using different sub-domain names, and thus from different application servers:

a. http://assets-0.mygameserver.com/Game.swf_0?buildrev=3 b. http://assets-1.mygameserver.com/Game.swf_1?buildrev=3 c. http://assets-2.mygameserver.com/Game.swf_2?buildrev=3 d. http://assets-3.mygameserver.com/Game.swf_3?buildrev=3

The client device 104 may use the four URLs above to download the plurality of file portions for the Fisville.swf application file from different hostnames, which facilitates distributing network resources across multiple application servers of the content delivery network 112, Client Device In some example embodiments, the client device 104 may improve the load time for a virtual game by using multiple network connections to distribute download requests across different application servers. Doing so facilitates the use of parallel network resources and minimizes the influence of network limitations or browser limitations. For example, some web browsers may not open more than four network connections to a single server hostname. Thus, for a file that is partitioned into more than four file portions, the client device 104 may send simultaneous requests to multiple servers at various hostnames of the content delivery network 112 to initiate more than four simultaneous network connections for the application file.

Figure 4:
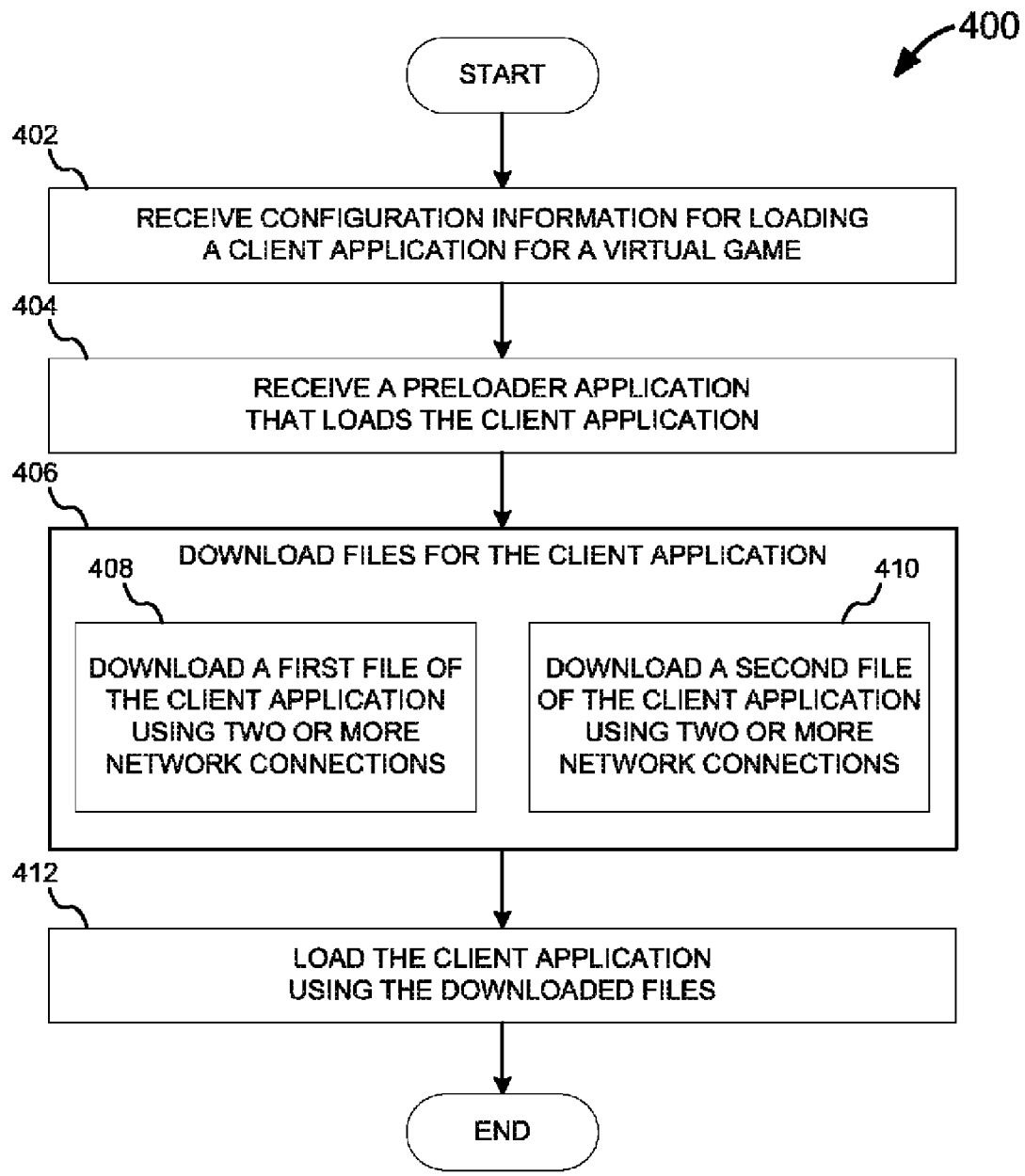
FIG. 4 shows a flowchart illustrating an example method for loading a client application at a client device using multiple simultaneous network connections.

FIG. 4 shows a flowchart illustrating an example method 400 to load a client application at a client device using multiple simultaneous network connections. In some embodiments, the method 400 may be performed using the client device 104 and, accordingly, is described by way of example with reference thereto.

The method 400 may begin at operation 402 by receiving configuration information for loading a client application for the virtual game, and receiving a preloader application that loads the client application at operation 404. For example, at operation 402, the method 400 may receive an MAIL document that includes the configuration information. In some example embodiments, the HTML document may include code that causes a web browser at the client device 104 to download and execute the preloader application, and that passes the configuration information as input parameters to the preloader application when launching the preloader application. The code of the HTML document may include a hyperlink to the preloader application, an EMBED HTML tag that loads the preloader application, or executable instructions (e.g., JavaScript code) that load the preloader application. Further, the HTML document may pass the configuration information to the preloader application within a query string in the URL that is used to download the preloader application. Also, if the preloader application is an Adobe® Flash® application, the code may pass the configuration information to the preloader application within the EMBED tag that loads the application by using a Flash Vars parameter that includes the configuration information.

At operation 406, the method 400 may download application files for the client application using multiple simultaneous network connections. For example, the method 400 may use the preloader application to download a first file of the client application using two or more network connections at operation 408, and to download a second file of the client application using two or more network connections at operation 410. In various embodiments, the method 400 may perform operations 408 and 410 simultaneously. Also, the two or more network connections of operations 408 and 410 may include multiple simultaneous network connections. Further, once the method 400 downloads a plurality of file portions for a file at operation 408 or 410, the method 400 may combine them into a single byte array (e.g., using the preloader application).

Once the method 400 completes the download of the application files for the client application, the method 400 may continue to operation 412 to load the client application using the downloaded application files (e.g., using the preloader application, or by executing JavaScript code in the HTML document that loads the client application).

In various embodiments, the client application for the virtual game may continue to fetch other game assets in the background during game play. These game assets may include other application files, which may be used when a player performs a particular in-game action (e.g., gifting, visiting a neighbor, etc.). The method 400 may download these additional game assets during game play using multiple simultaneous network connections, which improves game play responsiveness.

Figure 5:
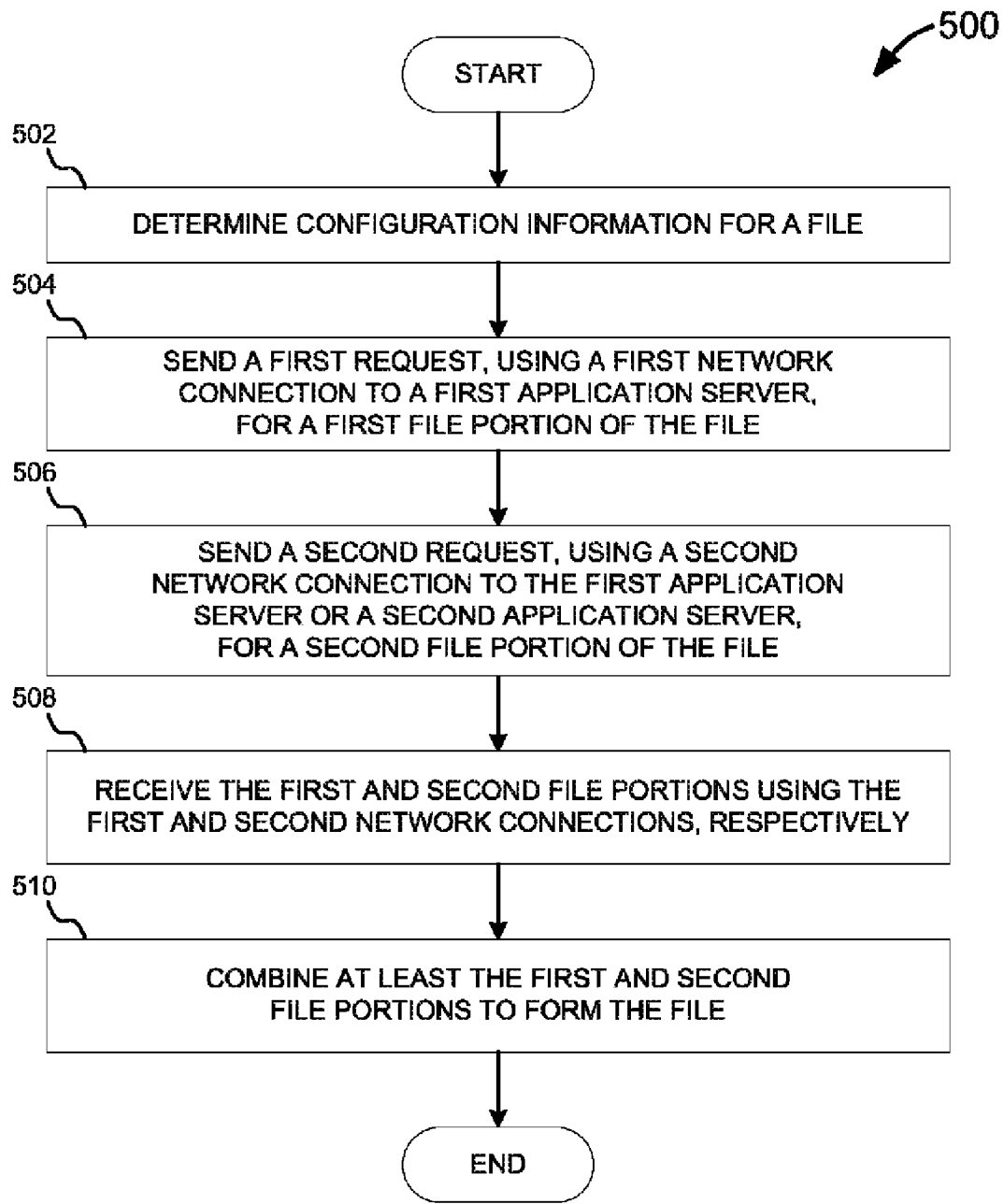
FIG. 5 shows a flowchart illustrating an example method for loading an application file at a client device using multiple simultaneous network connections.

FIG. 5 shows a flowchart illustrating an example method 500 to download an application file at a client device using multiple simultaneous network connections. In some embodiments, the method 500 may be performed using the client device 104 and, accordingly, is described by way of example with reference thereto. Further, the method 500 may correspond to operation 408 or 410 of method 400, and may be performed by executing the preloader application within a browser of the client device 104.

The method 500 may begin at operation 502 by determining configuration information for an application file. For example, the client device 104 may receive an HTML document from a server computer (e.g., the server 112.1 of the content delivery network 112) that includes the configuration information, and the method 500 may receive the configuration information from the web browser at the client device 104. The configuration information may indicate one or more hostnames for the application servers, and may also indicate a partition quantity for the plurality of file portions 208 into which the application file has been partitioned.

At operation 504, the method 500 may send a first request, using a first network connection to a first application server, for a first file portion of the application file. Further, at operation 506, the method 500 may send a second request, using a second network connection, to the first application server or to a second application server, for a second file portion of the application file.

Then, at operation 508, the method 500 may receive the first and second file portions using the first and second network connections, respectively. In some example embodiments, the method 500 may receive the first and second file portions in near-simultaneous network transactions. The method 500 may then continue to operation 510 to form the application file by combining at least the first and the second file portions.

In some example embodiments, during operation 504 or 506, the method 500 may determine a URL (or any other network address now known or later developed) for a particular file portion. For example, the method 500 may determine a hostname for a server computer from which to download the file portion (e.g., the server 112.1 of the content delivery network 112), and may determine a path for the file portion at the server computer. The method 500 may then determine the URL for the file portion by appending the path for the file portion to the hostname for the server computer.

In some example embodiments, the method 500 may determine the path for the file portion by determining a sequence number for the file portion from the plurality of file portions. The method 500 may then generate a first path string based on the configuration information (e.g., based on a filename for the file), and may generate a second path string that includes the sequence number (e.g., generating the string "_4" when the sequence number for the file portion is four). In some embodiments, the configuration information may include a naming scheme that indicates how the preloader application is to generate the second path string. Then, to determine the path for the file portion, the method 500 may combine the first path string and the second path string (e.g., by appending the second path string to the first path string, or by combining the first path string and the second path string as indicated by the naming scheme). For example, if a file is partitioned into six consecutive file portions (e.g., as indicated by the configuration information), the second file portion in the sequence is associated with a sequence number of two. Also, if the path to the file at a server computer is "/files/alpha.swf," then the path for the second file portion may be determined to be "/files/alpha.swf_2."

In some embodiments, the method 500 may determine the hostname for a server computer from a hash table of server names. The method 500 may generate the hash table to include the hostnames associated with the plurality of server computers of the content delivery network 112 (e.g., as indicated by the configuration information), and may generate a hash function for this hash table based on the configuration information. For example, the configuration information may indicate the hash function for method 500, or the method 500 may obtain a parameter for the hash function from the configuration information (e.g., a timestamp indicating a date and time for when the configuration information was generated). Further, the method 500 may determine a hostname for the file portion from the hash table by using the sequence number as input to the hash function.

In various example embodiments, the web browser at the client device 104 may cache the files it receives from the content delivery network 112 based on their URLs to improve the load time for the client application (e.g., caches the configuration information and the individual file portions). Therefore, the method 500 generate a consistent URL when downloading a particular file portion more than once to ensure that the file portion may be retrieved from the web browser's cache whenever possible. Thus, because the method 500 generates the hash function based on the configuration information (which is cached), the hash function may cause the method 500 to generate the same URL (e.g., including a consistent hostname) for multiple requests for a particular file portion. Further, because different client devices may implement different hash functions (e.g., may use a different timestamp for a variable of the hash function), these client devices may distribute their download requests for the file portion across the set of server computers of the content delivery network 112, while still retrieving the file portion from the cache whenever possible, For example, if the player 102 returns to the client device 104 to play a particular game that has been cached by the web browser, the method 500 may use cached configuration information to generate the same hash function, and to generate the URLs which were used when the application files for the game were cached by the web browser. Therefore, when the method 500 sends a request for a file portion using the same URL, the web browser may recognize that the file portion being requested is stored in cache, and may provide the method 500 with the cached copy of the file portion.

Figure 6:
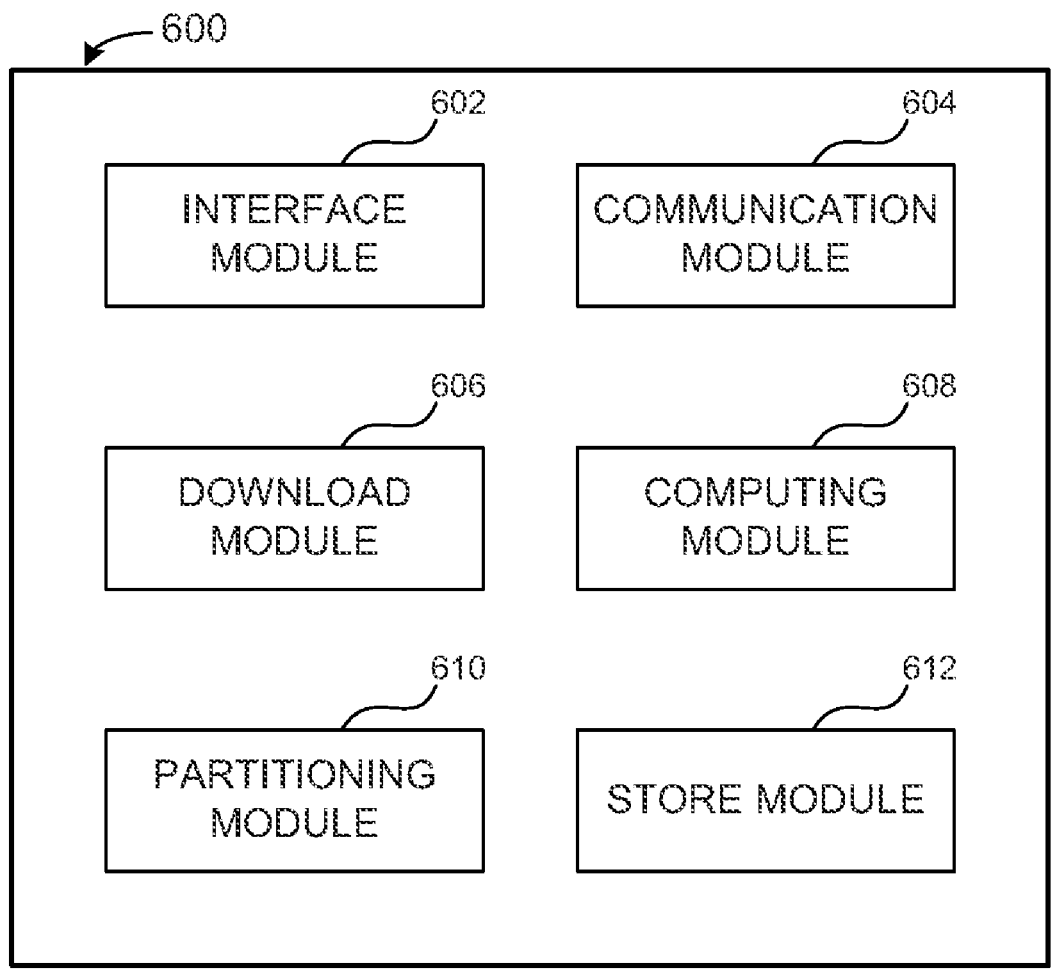
FIG. 6 illustrates an example apparatus, in accordance with various example embodiments.

FIG. 6 illustrates an example apparatus 600, in accordance with various example embodiments. The apparatus 600 may include an interface module 602, a communication module 604, a download module 606, a computing module 608, a partitioning module 610, and a store module 612.

In particular embodiments, modules 602-612 may be implemented using one Or more application-specific integrated circuit components, microprocessors, graphics processing units (GPUs), field-programmable gate arrays (FPGAs), or any combination thereof. In other embodiments, apparatus 600 may include a server-side computing device and/or a client side computing device, and modules 602-612 may include executable code that is stored within a computer-readable storage medium of apparatus 600 and executed by a processing unit of apparatus 600.

The interface module 602 may generate a GUI and/or a text-based user interface to interact with the player. For example, the interface module 602 may display a graphical splash page or a waiting icon to the player 102 while the apparatus 600 is downloading a file. In various examples, the user interface may include a web browser window that displays a web page that has been implemented using a combination of scripting technologies such as HTML, JavaScript, Cascading Style Sheet (CSS), ActionScript, and/or the like.

The communication module 604 may send a request for a file to a server computer. For example, when the player 102 uses the interface module 602 to initiate the virtual game (e.g., by loading the virtual game using a web browser), the communication module 604 may send a request for one or more application files for the virtual game. Then, the communication module 604 may receive configuration information for downloading the file, and may receive a preloader application that downloads a file using multiple network connections. The configuration information may indicate a partition quantity for the plurality of file portions 208 into which the file is partitioned at one or more server computers, and may indicate at least one hostname to a server computer that stores the plurality of file portions, The computing module 608 may execute the preloader application (e.g., within the web browser that is being presented to the player 102 using the interface module 602) to download the file using multiple network connections. For example, the player 102 may interact with the web browser to download the file (e.g., by using a pointing device to click on a hyperlink being displayed by the web browser, or by using an input device to enter a URL into an address bar of the web browser), at which point the communication module 604 may download the preloader application within the web browser, and the computing module 608 may execute the preloader application within the web browser to download the file using multiple network connections.

The download module 606 may download the plurality of file portions using a plurality of network connections (e.g., using the communication module 604 to open multiple network connections). For example, the download module 606 may determine URLs for a first and a second file portion of the file based on the configuration information, and may use separate network connections to download the first and the second file portions from their corresponding URLs. In some embodiments, the download module 606 may determine a URL from which to download a file portion by determining a sequence number for the file portion, and generating a URL by appending this sequence number to a file name for the file being downloaded.

The computing module 608 may reproduce the being downloaded by combining the plurality of file portions that are downloaded by the download module 606. For example, the computing module 608 may determine an order in which to combine the plurality of file portions based on their individual names (e.g., a file portion may indicate its sequence number as a suffix to the file portion's file name), or may receive the sequence number for individual file portions from the download module 606.

In some example embodiments, the apparatus 600 may prepare a file for other devices to download using multiple network connections (e.g., the apparatus 600 may implement the build system 108.3). For example, the partitioning module 610 may partition the file into a plurality of consecutive file portions, and the computing module 608 may generate configuration information that is used by the client device 104 to determine the URL for the individual file portions. Further, the store module 612 may store the configuration information and the plurality of file portions at one or more server computers for download by the client device 104, In some example embodiments, the apparatus 600 may host a file portion for other devices to download (e.g., the apparatus 600 may implement a server computer of the content delivery network 112). For example, the communication module 604 may receive a request for the file from the client device 104, and the communication module 604 may send the configuration information and the preloader application to the client device 104 in response to the request.

Systems and Methods

Figure 7:
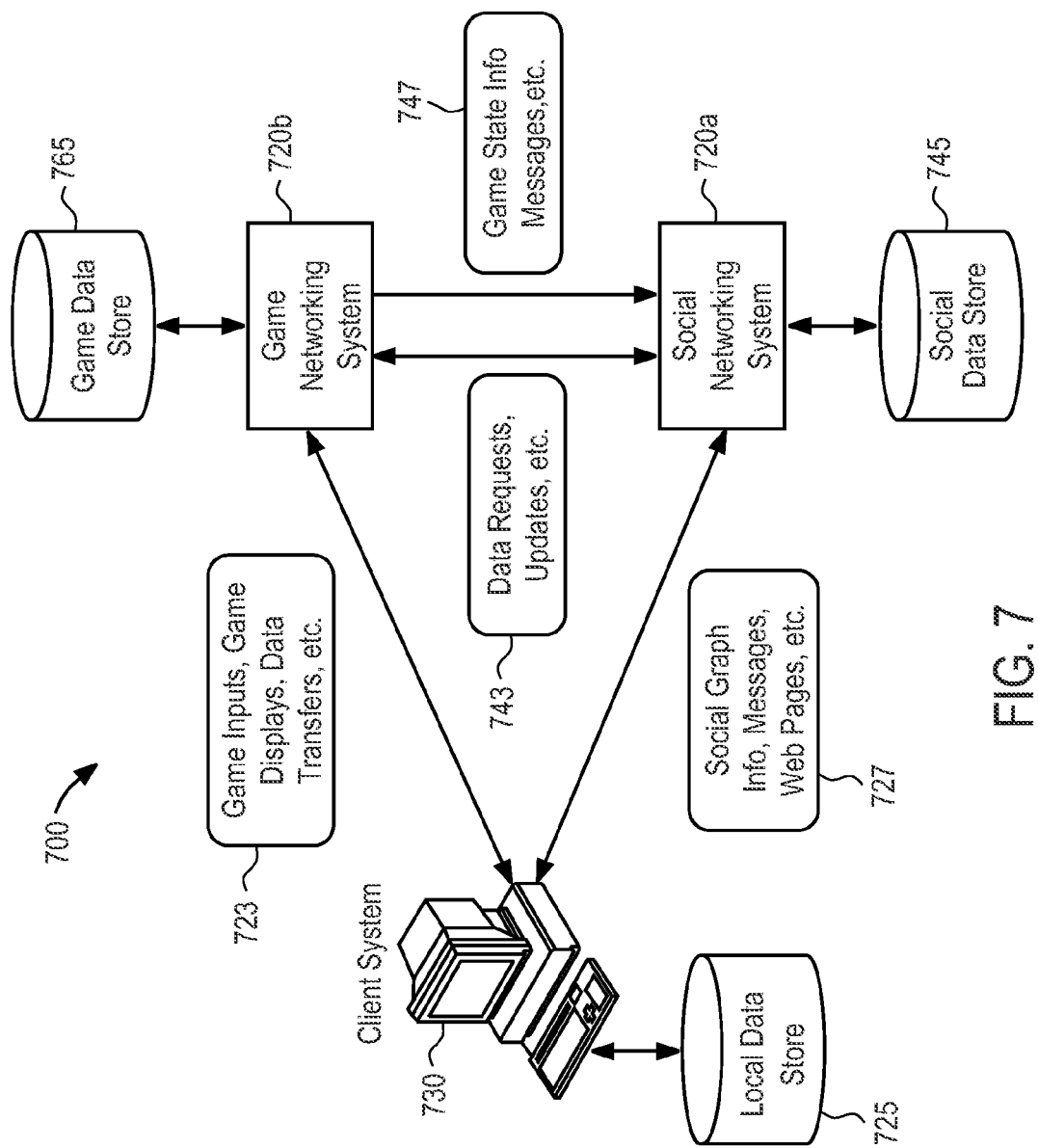
FIG. 7 illustrates an example data flow between the components of an example system.

FIG. 7 illustrates an example data flow between the components of an example system 700. In particular embodiments, the system 700 can include a client system 730, a social networking system 720a, and a game networking system 720b. The components of system 700 can be connected to each other in any suitable configuration, using any suitable type of connection. The components may be connected directly or over any suitable network. The client system 730, the social networking system 720a, and the game networking system 720b can each have one or more corresponding data stores such as a local data store 725, a social data store 745, and a game data store 765, respectively. The social networking system 720a and the game networking system 720b can also have one or more servers that can communicate with the client system 730 over an appropriate network. The social networking system 720a and the game networking system 720b can have, for example, one or more internet servers for communicating with the client system 730 via the Internet, Similarly, the social networking system 720a and the game networking system 720b can have one or more mobile servers for communicating with the client system 730 via a mobile network (e.g., GSM, PCS, Wi-Fi, WPAN, etc.). In some embodiments, one server may be able to communicate with the client system 730 over both the Internet and a mobile network. In other embodiments, separate servers can be used.

The client system 730 can receive and transmit data 723 to and from the game networking system 720b. This data can include, for example, web pages, messages, game inputs, game displays, HTTP packets, data requests, transaction information, updates, and other suitable data. At some other time, or at the same time, the game networking system 720b can communicate data 743, 747 (e.g., game state information, game system account information, page info, messages, data requests, updates, etc.) with other networking systems, such as the social networking system 720a (e.g., Facebook, Myspace, etc.). The client system 730 can also receive and transmit data 727 to and from the social networking system 720a. This data can include, for example, web pages, messages, social graph information, social network displays, HTTP packets, data requests, transaction information, updates, and other suitable data.

Communication between the client system 730, the social networking system 720a, and the game networking system 720b can occur over any appropriate electronic communication medium or network using any suitable communications protocols. For example, the client system 730, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as FTP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

With a client-server environment in which the virtual games may run, one server system, such as the game networking system 720b, may support multiple client systems 730. At any given time, there may be multiple players at multiple client systems 730 all playing the same virtual game. In practice, the number of players playing the same game at the same time may be very large. As the game progresses with each player, multiple players may provide different inputs to the virtual game at their respective client systems 730, and multiple client systems 730 may transmit multiple player inputs and/or game events to the game networking system 720b for further processing. In addition, multiple client systems 730 may transmit other types of application data to the game networking system 720b.

In particular embodiments, a computed-implemented game may be a text-based or turn-based game implemented as a series of web pages that are generated after a player selects one or more actions to perform. The web pages may be displayed in a browser client executed on the client system 730. As an example and not by way of limitation, a client application downloaded to the client system 730 may operate to serve a set of web pages to a player. As another example and not by way of limitation, a computer-implemented game may be an animated or rendered game executable as a stand-alone application or within the context of a web page or other structured document. In particular embodiments, the computer-implemented game may be implemented using Flash-based technologies. As an example and not by way of limitation, a virtual game may be fully or partially implemented as a SWF object that is embedded in a web page and executable by a Flash® media player plug-in. In particular embodiments, one or more described web pages may be associated with or accessed by the social networking system 720a. This disclosure contemplates using any suitable application for the retrieval and rendering of structured documents hosted by any suitable network-addressable resource or website, In particular embodiment, one or more objects of the virtual game may be represented as a Flash object. Flash may manipulate vector and raster graphics, and supports bidirectional streaming of audio and video. "Flash" may mean the authoring environment, the player, or the application files. In particular embodiments, the client system 730 may include a Flash client. The Hash client may be configured to receive and run Flash application or game object code from any suitable networking system (such as, for example, the social networking system 720a or the game networking system 720b). In particular embodiments, the Flash client may be run in a browser client executed on the client system 730. A player can interact with Flash objects using the client system 730 and the Flash client. The Flash objects can represent a variety of in-game objects. Thus, the player may perform various in-game actions on various in-game objects by make various changes and updates to the associated Flash objects.

In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure describes performing any suitable in-game action by interacting with any suitable Flash object. In particular embodiments, when the player makes a change to a Flash object representing an in-game object, the client-executed game logic may update one or more game state parameters associated with the in-game object.

To ensure synchronization between the Flash object shown to the player at the client system 730, the Flash client may send the events that caused the game state changes to the in-game object to the game networking system 720b. However, to expedite the processing and hence the speed of the overall gaming experience, the Flash client may collect a batch of some number of events or updates into a batch file. The number of events or updates may be determined by the Flash client dynamically or determined by the game networking system 720b based on server loads or other factors. For example, the client system 730 may send a batch file to the game networking system 720b whenever 50 updates have been collected or after a threshold period of time, such as every minute.

In particular embodiments, when the player 102 plays the virtual game on the client system 730, the game networking system 720b may serialize all the game-related data, including, for example and without limitation, game states, game events, user inputs, for this particular user and this particular game into a binary large object (BLOB) and stores the BLOB in a database. The BLOB may be associated with an identifier that indicates that the BLOB contains the serialized game-related data for a particular player and a particular virtual game. In particular embodiments, while a player is not playing the virtual game, the corresponding BLOB may be stored in the database. This enables a player to stop playing the game at any time without losing the current state of the game the player is in. When a player resumes playing the game next time, game networking system 720b may retrieve the corresponding BLOB from the database to determine the most-recent values of the game-related data. In particular embodiments, while a player is playing the virtual game, the game networking system 720b may also load the corresponding BLOB into a memory cache so that the game system may have faster access to the BLOB and the game-related data contained therein.

In particular embodiments, one or more described web pages may be associated with a networking system or networking service. However, alternate embodiments may have application to the retrieval and rendering of structured documents hosted by any type of network addressable resource or website. Additionally, as used herein, a user may be an individual, a group, or an entity (such as a business or third party application).

Figure 8:
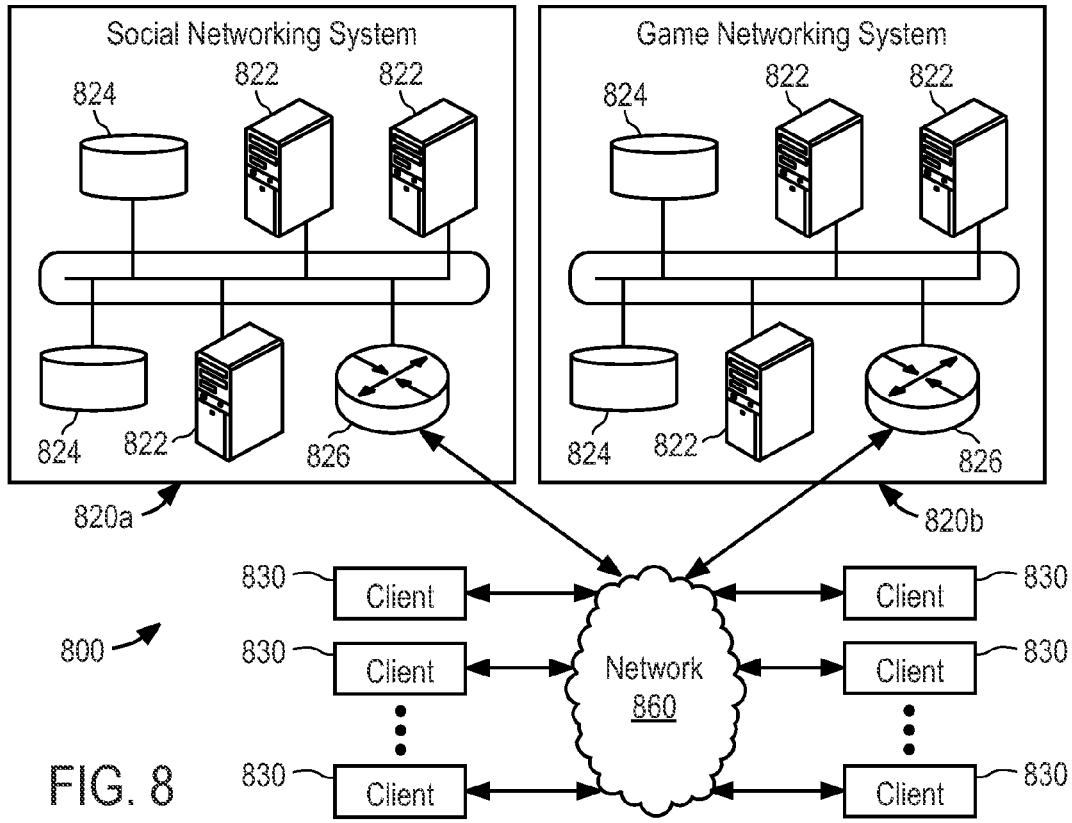
FIG. 8 illustrates an example network environment, in which various example embodiments may operate.

Particular embodiments may operate in a wide area network environment, such as the Internet, including multiple network addressable systems. FIG. 8 illustrates an example network environment 800 in which various example embodiments may operate. The network environment 800 may include a network cloud 860 that generally represents one or more interconnected networks, over which the systems and hosts described herein can communicate. The network cloud 860 may include packet-based wide area networks (such as the Internet), private networks, wireless networks, satellite networks, cellular networks, paging networks, and the like. As FIG. 8 illustrates, particular embodiments may operate in the network environment 800 comprising one or more networking systems, such as a social networking system 820a, a game networking system 820b, and one or more a client systems 830. The components of the social networking system 820a and the game networking system 820b operate analogously; as such, hereinafter they may be referred to simply as the networking system 820. The client systems 830 are operably connected to the network environment 800 via a network service provider, a wireless carrier, or any other suitable means.

The networking system 820 is a network addressable system that, in various example embodiments, comprises one or more physical servers 822 and data stores 824. The one or more physical servers 822 are operably connected to network cloud 860 via, by way of example, a set of routers and/or networking switches 826. In an example embodiment, the functionality hosted by the one or more physical servers 822 may include web or HTTP servers, FTP servers, as well as, without limitation, web pages and applications implemented using Common Gateway interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

The network environment 800 may include physical servers 822 that may host functionality directed to the operations of the networking system 820. Hereinafter the servers 822 may be referred to as the server 822, although the server 822 may include numerous servers hosting, for example, the networking system 820, as well as other content distribution servers, data stores, and databases. The network environment 800 may also include a data store 824 that may store content and data relating to, and enabling, operation of the networking system 820 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, the data store 824 corresponds to one or more of a variety of separate and integrated databases, such as relational databases and object-oriented databases, that maintain information as an integrated collection of logically related records or files stored on one or more physical systems. Structurally, data store 824 may generally include one or more of a large class of data storage and management systems. In particular embodiments, the data store 824 may be implemented by any suitable physical system(s) including components, such as one or more database servers, mass storage media, media library systems, storage area networks, data storage clouds, and the like. In one example embodiment, data store 824 includes one or more servers, databases (e.g., MySQL), and/or data warehouses. The data store 824 may include data associated with different networking system 820 users and/or client systems 830.

The client system 830 is generally a computer or computing device including functionality for communicating (e.g., remotely) over a computer network. The client system 830 may be a desktop computer, laptop computer, personal digital assistant (PDA), in or out-of-car navigation system, smart phone or other cellular or mobile phone, or mobile gaming device, among other suitable computing devices. The client system 830 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of the client system 830 to enter addresses of specific network resources to be retrieved, such as resources hosted by the networking system 820. These addresses can be URLs and the like. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A web page or resource embedded within a web page, which may itself include multiple embedded resources, may include data records, such as plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a web page may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at the client system 830 desires to view a particular web page (hereinafter also referred to as target structured document) hosted by the networking system 820, the user's web browser, or other document rendering engine or suitable client application, formulates and transmits a request to the networking system 820. The request generally includes a URL or other document identifier as well as metadata or other information. By way of example, the request may include information identifying the user, such as a user ID, as well as information identifying or characterizing the web browser or operating system running on the user's client system 830. The request may also include location information identifying a geographic location of the user's client system 830 or a logical network location of the user's client system 830. The request may also include a timestamp identifying when the request was transmitted, Although the example network environment 800 described above and illustrated in FIG. 8 is described with respect to the social networking system 820a and the game networking system 820h, this disclosure encompasses any suitable network environment using any suitable systems. As an example and not by way of limitation, the network environment may include online media systems, online reviewing systems, online search engines, online advertising systems, or any combination of two or more such systems.

Figure 9:
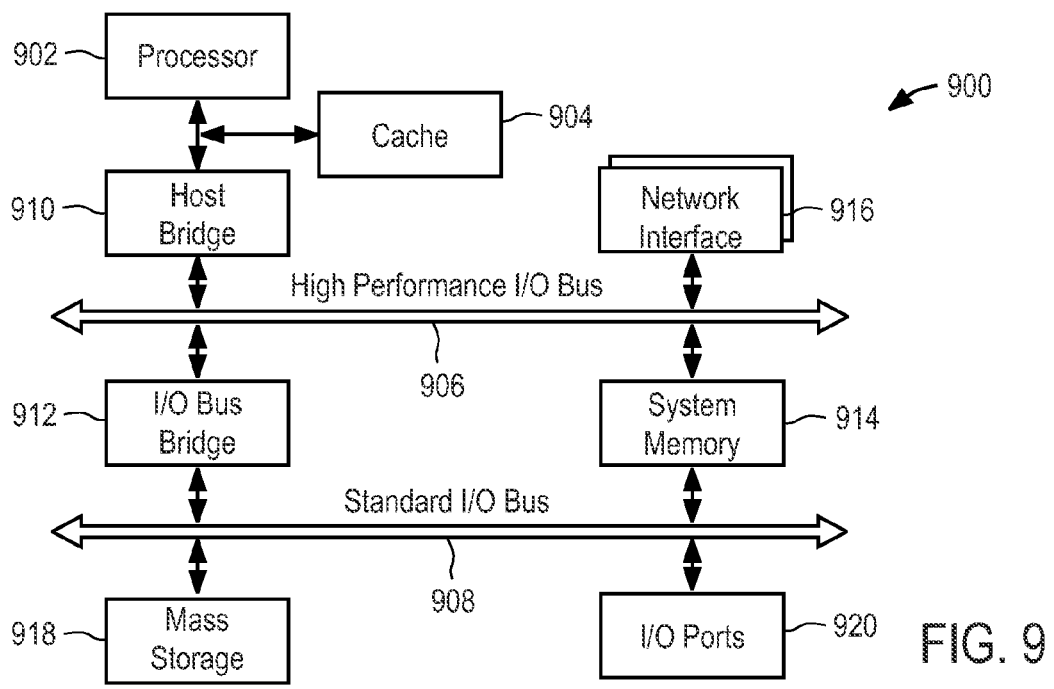
FIG. 9 illustrates an example computing system architecture, which may be used to implement a server or a client system.

FIG. 9 illustrates an example computing system architecture, which may be used to implement the server 822 or the client system 830. In one embodiment, a hardware system 900 comprises a processor 902, a cache memory 904, and one or more executable modules and drivers, stored on a tangible computer-readable medium, directed to the functions described herein. Additionally, hardware system 900 may include a high performance input/output (I/O) bus 906 and a standard I/O bus 908. A host bridge 910 may couple the processor 902 to a high performance I/O bus 906, whereas an I/O bus bridge 912 couples the two buses 906 and 908 to each other. A system memory 914 and one or more network/communication interfaces 916 may couple to the bus 906. The hardware system 900 may further include video memory (not shown) and a display device coupled to the video memory. A mass storage 918 and I/O ports 920 may couple to the bus 908.

The hardware system 900 may optionally include a keyboard, a pointing device, and a display device (not shown) coupled to the bus 908. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 900 are described in greater detail below. In particular, the network interface 916 provides communication between the hardware system 900 and any of a wide range of networks, such as an Ethernet (e.g., IEEE 802.3) network, a backplane, etc. The mass storage 918 provides permanent storage for the data and programming instructions to perform the above-described functions implemented in the servers 822 of FIG. 8, whereas the system memory 914 (e.g., DRAM) provides temporary storage for the data and programming instructions when executed by the processor 902. The I/O ports 920 are one or more serial and/or parallel communication ports that provide communication between additional peripheral devices, which may be coupled to the hardware system 900.

The hardware system 900 may include a variety of system architectures, and various components of the hardware system 900 may be rearranged. For example, the cache memory 904 may be on-chip with the processor 902. Alternatively, the cache memory 904 and the processor 902 may be packed together as a "processor module," with the processor 902 being referred to as the "processor core." Furthermore, certain embodiments of the present disclosure may not include all of the above components. For example, the peripheral devices shown coupled to the standard I/O bus 908 may couple to the high performance I/O bus 906. In addition, in some embodiments, only a single bus may exist, with the components of the hardware system 900 being coupled to the single bus. Furthermore, the hardware system 900 may include additional components, such as additional processors, storage devices, or memories.

An operating system manages and controls the operation of the hardware system 900, including the input and output of data to and from software applications (not shown). The operating system provides an interface between the software applications being executed on the hardware system 900 and the hardware components of the hardware system 900. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably, and additionally may refer to a custom or generalized API on a device, such as a mobile device (e.g., cellular phone, smart phone, personal GPS, personal digital assistance, personal gaming device, etc.), that makes API calls directly to a server, Still further, while the embodiments described above operate with business-related virtual Objects (such as stores and restaurants), the embodiments of the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
    receiving configuration information for downloading an application file, the configuration information indicating a partition quantity, indicating a number of file portions into which the application file is partitioned at one or more server computers;
    determining network addresses for the multiple file portions based on the configuration information;
    issuing a request for each of the multiple file portions based on the network addresses, the requests being issued over multiple fretwork connections;
    receiving the multiple file portions over the multiple network connections, at least two of the multiple file portions being received simultaneously over separate ones of the multiple network connections; and
    using at least one processor, combining the received multiple file portions to form the application file;
    wherein the determining of a network address for a first file portion of the multiple file portions comprising: determining a hostname for a first server computer based on the configuration information; determining a path for the first file portion based on the configuration information; and generating the network address by combining the hostname and the path;
    wherein the determining of the hostname for the first server computer comprising: determining a sequence number for the first file portion; and determining the hostname for the first server computer based on a hash table of server computer hostnames by using the sequence number as input to a hash function for the hash table.

2. The method of claim 1, further comprising:
    using a web browser at a client device, receiving a preloader application to download the application file; and
    executing the preloader application within the web browser to perform the determining of the network addresses, the issuing of the requests, the receiving of the multiple file portions, and the combining of the multiple file portions.

3. The method of claim 2, the receiving of the configuration information comprising receiving a hypertext markup language (HTML) document that includes the configuration information, and the executing of the preloader application comprising passing the configuration information as input parameters to the preloader application.

4. The method of claim 1, the configuration information indicating at least one hostname to a server computer storing the multiple file portions; and the method further comprising:
    generating the hash table to include the at least one hostname; and
    generating the hash function based on the configuration information.

5. The method of claim 1, the determining of the path for the first file portion comprising:
    generating a first path string based on the configuration information;
    determining a sequence number for the first file portion;
    generating a second path string that includes the sequence number; and
    determining the path for the first file portion by combining the first path string and the second path string.

6. A method comprising:
    partitioning an application file into multiple file portions so that a size of each of the multiple file portions is below a predetermined threshold;
    storing the multiple file portions at one or more server computers, each of the multiple file portions being associated with a network address from which a client device downloads the associated file portion;
    using at least one processor, generating configuration information that is used by the client device to determine the network address for each of the multiple file portions, the configuration information indicating a partition quantity for the multiple file portions into which the application file is partitioned, and indicating a hostname for a server computer; and
    storing the configuration information at the server computer;
    wherein the determining of a network address for a first file portion of the multiple file portions comprising: determining a hostname for a first server computer based on the configuration information; determining a path for the first file portion based on the configuration information; and generating the network address by combining the hostname and the path;
    wherein the determining of the hostname for the first server computer comprising: determining a sequence number for the first file portion; and determining the hostname for the first server computer based on a hash table of server computer hostnames by using the sequence number as input to a hash function for the hash table.

7. The method of claim 6, further comprising:
receiving a request for the file from the client device for the application file; and
sending a preloader application and the configuration information to the client device, the preloader application being operable to use the configuration information to download the multiple file portions using multiple network connections and to combine the multiple file portions to form the file.

8. The method of claim 7, the sending of the configuration information to the client device comprising sending a hypertext markup language (HTML) document that includes the configuration information, and the client device executing the preloader application within a web browser by passing the configuration information as input parameters to the preloader application.

9. An apparatus comprising:
a processor;
a communication module to receive configuration information for downloading an application file, the configuration information indicating a partition quantity indicating a number of file portions into which the application file is partitioned at one or more server computers;
a download module to determine network addresses for the multiple file portions based on the configuration information, to issue a request for each of the multiple file portions based on the network addresses, the requests being issued over multiple network connections, and to receive the multiple the portions over the multiple network connections, at least two of the multiple file portions being received simultaneously over separate ones of the multiple network connections; and
a computing module to form the application file by combining the received multiple file portions;
wherein the download module determining the network address for a first file portion of the multiple file portions by: determining a hostname for a first server computer based on the configuration information; determining a path for the first file portion based on the configuration information; and generating the network address by combining the hostname and the path;
wherein the download module determining the hostname for the first server computer by: determining a sequence number for the first file portion; and determining the hostname for the first server computer based on a hash table of server computer hostnames by using the sequence number as input to a hash function for the hash table.

10. The apparatus of claim 9, the communication module receiving a preloader application in response to a request for the application file from a web browser, the preloader application being operable to download the application file; and
the computing module executing the preloader application within the web browser to determine the network addresses, to issue the requests for the multiple file portions, and to receive the multiple file portions using the download module, and to perform the combining of the multiple file portions.

11. The apparatus of claim 10, the receiving of the configuration information comprising receiving a hypertext markup language (HTML) document that includes the configuration information, and the executing of the preloader application comprising passing the configuration information as input parameters to the preloader application.

12. The apparatus of claim 10, the communication module to store the configuration information in a local cache, and to retrieve the configuration information in response to a second request for the application file.

13. The apparatus of claim 12, the download module to store at least one file portion in the local cache, and to retrieve the at least one file portion from the local cache in response to the second request for the application file, the computing module to combine the at least one file portion with remaining ones of the multiple file portions to form the application file.

14. The apparatus of claim 13, the cache being provided via the web browser.

15. The apparatus of claim 9, the configuration information indicating at least one hostname to a server computer storing the multiple file portions; and the computing module being further configured to:
generate the hash table to include the at least one hostname; and
generate the hash function based on the configuration information.

16. The apparatus of claim 9, the download module determining of the path for the first file portion by:
generating a first path string based on the configuration information;
determining a sequence number for the first file portion;
generating a second path string that includes the sequence number; and
determining the path for the first file portion by combining the first path string and the second path string.

\* \* \* \* \*

UNITED STATES PATENT AND TRADEMARK OFFICE
CERTIFICATE OF CORRECTION

PATENT NO. : 8,150,914 B1  
APPLICATION NO. : 13/244835  
DATED : April 3, 2012  
INVENTOR(S) : Manik Taneja et al.

Page 1 of 1

It is certified that error appears in the above-identified patent and that said Letters Patent is hereby corrected as shown below:

Title page, item (75), in "Inventors", in column 1, line 4, delete "Javesh Jose" and insert -- Jayesh Jose --, therefor.

In column 17, line 51, in Claim 1, delete "quantity," and insert -- quantity --, therefor.

In column 17, line 58, In Claim 1, delete "fretwork" and insert -- network --, therefor.

In column 19, line 33, in Claim 9, delete "multiple the" and insert -- multiple file --, therefor.

In column 20, lines 39-40, in Claim 16, delete "determining of the path" and insert -- determining the path --, therefor.

Signed and Sealed this
Twelfth Day of June, 2012

David J. Kappos
*Director of the United States Patent and Trademark Office*